United States Patent [19]
Murata

[11] Patent Number: 5,915,259
[45] Date of Patent: *Jun. 22, 1999

[54] DOCUMENT SCHEMA TRANSFORMATION BY PATTERNS AND CONTEXTUAL CONDITIONS

[75] Inventor: Makoto Murata, Kawasaki, Japan

[73] Assignee: Xerox Corporation, Stamford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/619,053

[22] Filed: Mar. 20, 1996

[51] Int. Cl.$^6$ .................................................... G06F 17/27
[52] U.S. Cl. ............................................................. 707/513
[58] Field of Search .................................. 395/774, 776, 395/612, 759, 785; 707/513

[56] References Cited

U.S. PATENT DOCUMENTS

| | | | |
|---|---|---|---|
| 5,491,628 | 2/1996 | Wakayama et al. ................. | 707/523 X |
| 5,557,720 | 9/1996 | Brown, Jr. et al. ..................... | 707/513 |

OTHER PUBLICATIONS

Gilleron et al., "Solving Systems of Set Constraints with Negated Subset Relationships", Proc. of 1993 IEEE 34th Annual Symposium on Foundations of Computer Science, pp. 372–380, Nov. 1993.

D.S. Arnon, "Scrimshaw: A language for document queries and transformations"; Electronic Publishing, vol. 6(4), 385–396, Dec. 1993.

L.S. Colby, "An Algebra for List–Oriented Applications", Technical Report No. 347; Indiana University, Bloomington, IN, Dec. 1992.

J.W. Thatcher, "Characterizing Derivation Trees of Context-Free Grammars through a Generalization of Finite Automata Theory", Journal of Computer and System Sciences: 1, 317–322 (1967).

Gecseg et al., "Tree Automata", Akademiai Kiado, Budapest, 1984.

Nivat et al., "Another variation on the common subexpression problem", Discrete Mathematics, v. 114 (1993), pp. 379–401.

A. Podelski, "A Monoid Approach to Tree Automata", *Tree Automata and Languages*, M. Nivat and A. Podelski (editors), pp. 41–56, Jan. 1992.

*Primary Examiner*—Anton Fetting
*Attorney, Agent, or Firm*—Mark Costello; Gary B. Cohen

[57] ABSTRACT

A computer-based method for providing the generation of schemas for output documents. An output schema representing a desired output condition of a document is created from inputs comprising a tree transformation rule defined by at least a pattern, a contextual condition, an input schema, and user specified parameters. A match-identifying tree automaton is created from the one pattern, the contextual condition, and the input schema; and the match-identifying tree automaton is modified with respect to said user specified parameters.

12 Claims, 8 Drawing Sheets

```
    ┌─101   ┌─106   ┌─109
103─<!ELEMENT doc --(sec)   +(fn)>
                                    ┌─107
104─<!ELEMENT sec  -O(title, para*,sec*)>
105─<!ELEMENT title -O(#PCDATA) -(fn)>  ┌─108
                                     108─110
    <!ELEMENT (para fn) -O(#PCDATA)>
    Document Type Definition D0
              │
             102
```

FIG. 1

```
<doc>
  <fn> simple doc created for IP</fn>
  <sec>
    <title>SGML
    <sec>
      <title>DTD
      <sec>
        <title>elements
        <para>a set of GI's are defined.
      <sec>
        <title>attributes </title>
        <para>information is attached.</para>
      <sec>
        <title>example </title>
        <para>see attached.</para>
</doc>
    Document Instance d0
```

FIG. 2

1 SGML

1.1 DTD

1.1.1 elements a set of GI's are defined.

1.1.2 attributes information is attached.

2 example see attached

---

[1] simple doc created for IP

*FIG. 3*

DOCUMENT SCHEMA TRANSFORMATION BY PATTERNS AND CONTEXTUAL CONDITIONS

The present invention relates to a method and apparatus for processing structured document information such as SGML documents.

BACKGROUND OF THE INVENTION

Most large organizations today have a class of document information which drives critical business processes and is of the highest value. For example, the maintenance of large airplanes is derived by document information of 100,000 pages. There is no doubt that the management of such document information is a key for success. Document information is typically organized for particular purposes, namely, driving presupposed business processes. However, the same information can be, if reorganized, utilized for different purposes. For example, Northwest may want to reorganize document information provided by Boeing and McDonnell-Douglas so as to efficiently maintain their airplanes in their own manner.

Many document models, notably SGML, introduce tree structures to documents. Document reorganization, the generation of new documents by assembling components of existing documents, can thus be computerized by writing tree transformation programs.

Furthermore, some document models, including SGML, introduce schemas of documents. Schemas describe which types of nodes may appear in documents and which hierarchical relationships such nodes may have. Such described information helps programmers to write tree transformation programs. A schema is typically represented by an extended context-free grammar. A tree is an instance of this schema if it is a parse tree of that grammar.

Some programming languages have been proposed to handle SGML documents. Scrimshaw (Arnon, "Scrimshaw, A language for document queries and transformation" Electronic Publishing—Origination, Dissemination, and Design 6(4):385–396, December 1993) and Omnmiark (Exoterica) are examples. An operator in such languages has a pattern and/or contextual condition as parameters (although Scrimshaw has patterns only, and Omnimark has contextual conditions only). The nodes to be handled by that operator are located by the pattern and/or contextual condition, as shown in FIG. 5.

As used herein, a pattern is a collection of conditions on a node and its directly-or-indirectly subordinate nodes. Each condition concerns the type, content, or attributes of a node. As an example, consider a pattern: figures whose captions contain the string "foo". It can be more formally stated as a node A such that 1) A is a figure, and
2) A has a subordinate node B such that
    2-1) B is a caption, and
    2-2) B contains the string foo. In the example, 1) is a condition on nodes and 2) is a pair of conditions on subordinate nodes.

A contextual condition is a collection of conditions on superior nodes, sibling nodes, and subordinates of the sibling nodes. For instance, assume that in the previous example we are interested only in those figures in sections entitled "bar". Then, we want to introduce a contextual condition: the figure must be directly or indirectly subordinate to a section node such that its title node contains the string "bar". It can be more formally stated as a node A has a (possibly indirect) superior node D such that 1) D is a section, and
2) D has a subordinate node E such that
    2-1) E is a title, and
    2-2) E contains the string "bar". In this example, 1) is a condition on a (possibly indirect) superior node and 2) is a pair of conditions on a subordinate of this superior node.

An operator specifies the types of operations such as delete, insert, reorder, copy, etc. For example, the delete operator specifies that the subtree located by the pattern and the contextual condition be removed from the input document.

A serious drawback of document programming languages is that DTD's (Document Type Definitions) for output documents are not generated. However, DTD's are mandatory for further utilizing the output documents.

To avoid this problem, the programmer writes a DTD for output documents in advance. He or she then writes programs carefully so that output documents should conform to this DTD. Obviously, this process becomes difficult if programs become complicated. Moreover, conformity is never ensured. The programmer can test the conformity for some output documents, but the next output document might not conform.

In Colby, "An algebra for list-oriented applications", Technical Report TR 347, Indiana University, Bloomington, Ind., December 1992, propose a model for list-oriented database systems that can be used for documents. Like document programming languages, operators in this model have patterns. Furthermore, a schema can be generated for output documents, as illustrated in FIG. 6. That is, given a pattern, an input document, and an input schema, each operator generates not only an output document but also an output schema. It is ensured that each output document conforms to the output schema. A serious drawback of this model is that output schemas are sufficient, but not minimal. In other words, aside from documents that can be generated from the program (called "query"), many other documents also conform to the output schema. Such loose schemas contradicts the original intention of having schemas. That is, they do not help programmers.

Another problem in the above reference is that only simple schemas are allowed. Though a scheme is an extended context free grammar, the right-hand-side of each production rule is limited to either a sequence of non-terminals, a non-terminal followed by the star operator, or a value (type). As a result, to store an SGML document conforming to a DTD in the proposed database system, the DTD has to be converted to a very different schema, and the document has to be significantly changed accordingly.

Furthermore, contextual conditions are not allowed and patterns are weak: they may concern direct subordinates but may not concern indirect subordinates. As a result, some operations, which would be straightforward if powerful patterns and contextual conditions were available, are hard to implement.

United States Patent Application Ser. No. 08/367,553 entitled "System for Data Format Modification and Instance Translator Construction" by An Feng, (hereinafter, Feng) and assigned to the same assignee as the present invention, (currently pending) is also of interest. Although only the conversion of SGML-documents is mentioned as a motivation, the invention claimed in this patent application applies to the transformation of documents in general, as illustrated by FIG. 7.

This reference shows that, given an input DTD and a sequence of pattern-parameterized operators, a system generates an output DTD and a conversion program (called "instance translator"). This program in turn generates an output SGML document conforming to this output DTD from an input SGML document conforming to the input DTD. Unlike the Colby's model, any extended context-free grammar is allowed as a schema. However, this invention is not free from the other problems of Colby's model. Output schemas are sufficient but not minimal. Contextual conditions are not allowed. Patterns are weak: conditions on direct superiors are allowed but conditions on indirect superiors are not.

The references described above are incorporated by reference for their teachings.

SUMMARY OF THE INVENTION

The present invention is directed to a method for providing the generation of schemas for output documents. A document is represented by a tree. A schema is a tree regular language given by some representation (e.g., an extended context-free grammar, a tree automaton, or a tree regular expression). A pattern is also a tree regular language given by some representation. A contextual condition is a pointed tree language given by a pointed tree representation. Each operator generates an output document from an input document and a pattern. What is more, it generates an output schema from an input schema and a pattern.

Patterns and contextual conditions are very powerful: conditions on indirect-or-direct subordinates, superiors, siblings, and subordinates of siblings are allowed. Schemas are very expressive: any extended context free grammar (and even any tree regular language) is allowed. An output schema is the smallest; that is, if another schema allows any document created from some instance of the input schema, then this schema allows at least those documents allowed by the output schema. If we do not use SGML, we can go even further. That is, an output schema is minimally sufficient: if a document A conforms to an output schema, there exists a document B such that A can be constructed from B.

The present invention allows 1) contextual conditions, 2) more powerful patterns and 3) smaller output schema in comparison to prior structured document process methods. Since 1) and 2) allow programmers to specify relevant nodes more precisely the task of writing document transformation programs becomes easier, 3) also makes this task easier, as smaller schemas allow programmers to concentrate on exactly those documents they should consider. In other words, they have to consider only those documents that may be created from some input documents.

Referring to FIG. 8, the key idea is the construction of a match-identifying tree automaton 450 from an input schema 452, a pattern 454, and a contextual condition 455. A match-identifying tree automata identifies matches at the schema level while accepting the same set of trees 456 as does the input schema. More formally, a match-identifying tree automaton M is a tree automaton such that A tree is accepted by M if and only if it is an instance of the input schema.

The states of M are classified into marked states and unmarked states.

A node matches the pattern if and only if M associates a marked state with this node (in successful computation).

Having constructed a match-identifying tree automaton, we can disregard the input schema and the tree pattern. We only have to consider the match-identifying tree automaton. An output schema 460 can be created by modifying the match-identifying tree automaton according to the semantics of the operator.

These and other aspects of the invention will become apparent from the following descriptions to illustrate a preferred embodiment of the invention read in conjunction with the accompanying drawings in which:

FIG. 1 is an example of Document Type Definition (DTD) for a document in the Standard Generalized Markup Language (SGML);

FIG. 2 is a document instance of the DTD of FIG. 1;

FIG. 3 illustrates the document instance of FIG. 2 as it would appear when formatted and printed;

DETAILED DESCRIPTION

Figure 4:
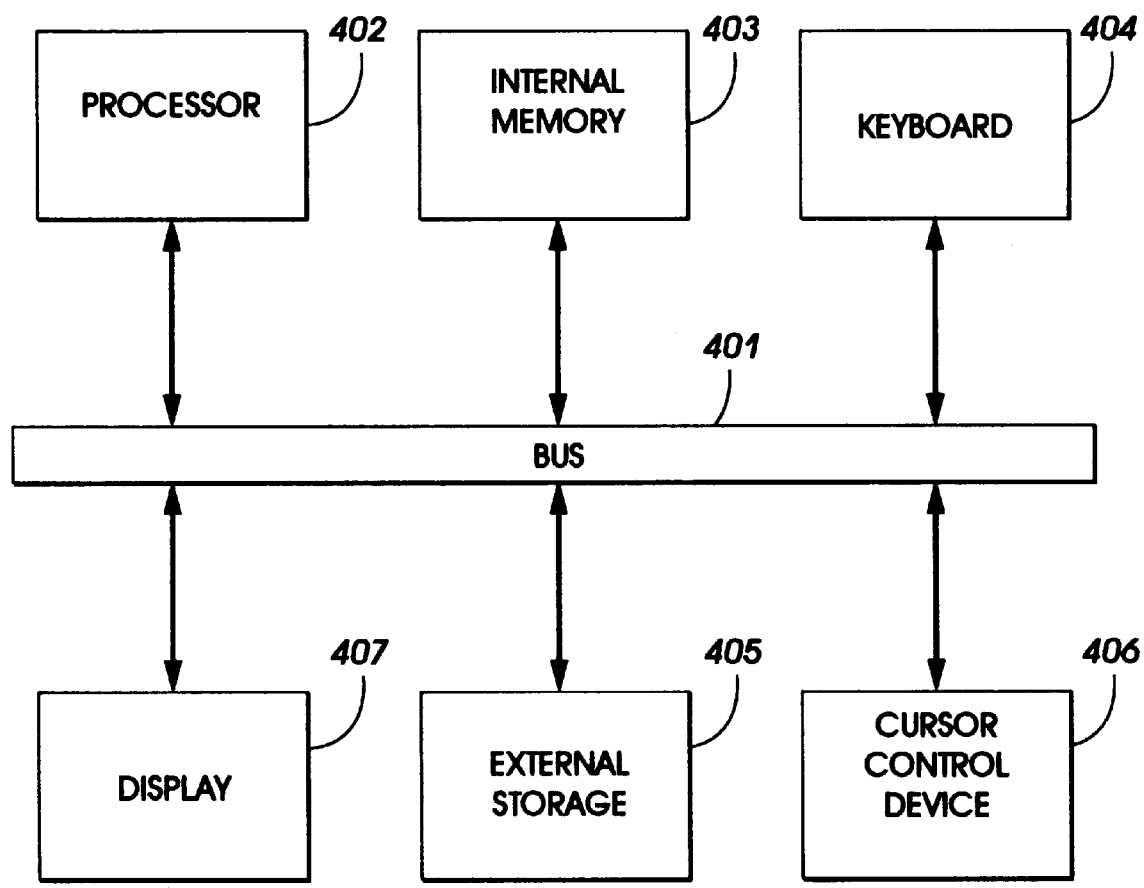
FIG. 4 is a block diagram of a computer based system as may be utilized by the currently preferred embodiment of the present invention.
Figure 5:
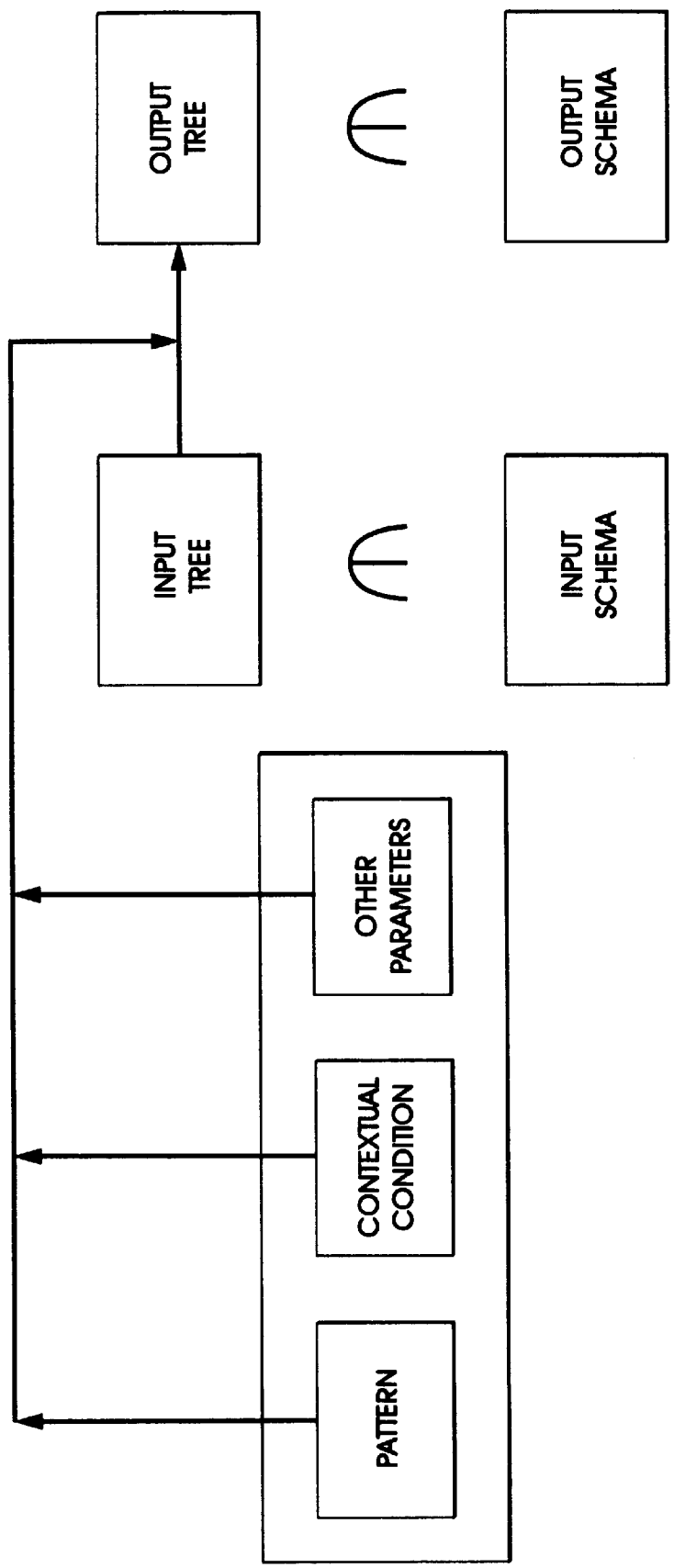
FIG. 5 is a block diagram showing the general use of a programming language to handle SGML documents, similar to that shown in Scrimshaw or Exoterica.
Figure 6:
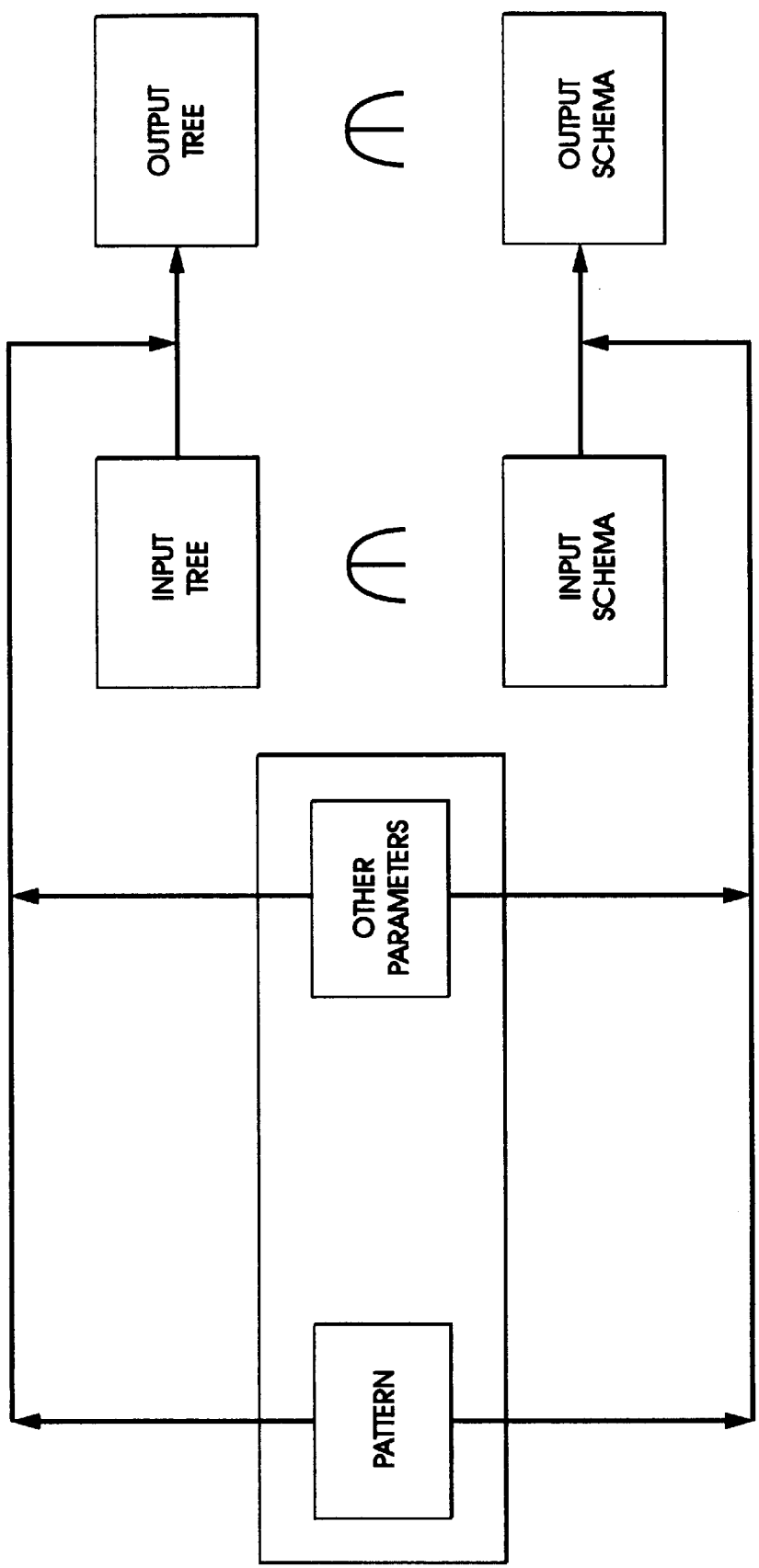
FIG. 6 illustrates the use of a programming language to handle SGML documents, as modified by Colby.
Figure 7:
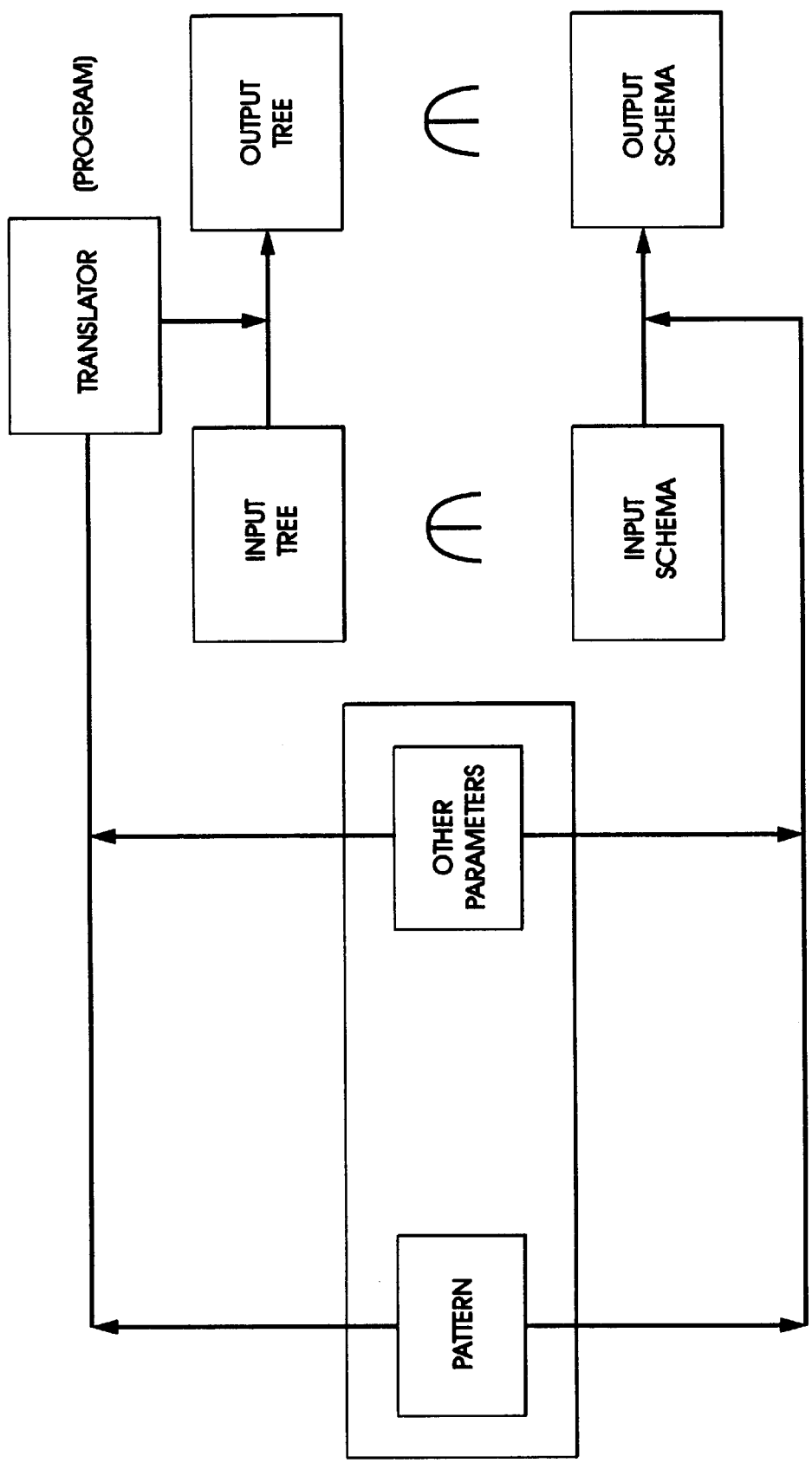
FIG. 7 illustrates the use of a programming language to handle SGML documents, similar to Colby as modified by Feng.
Figure 8:
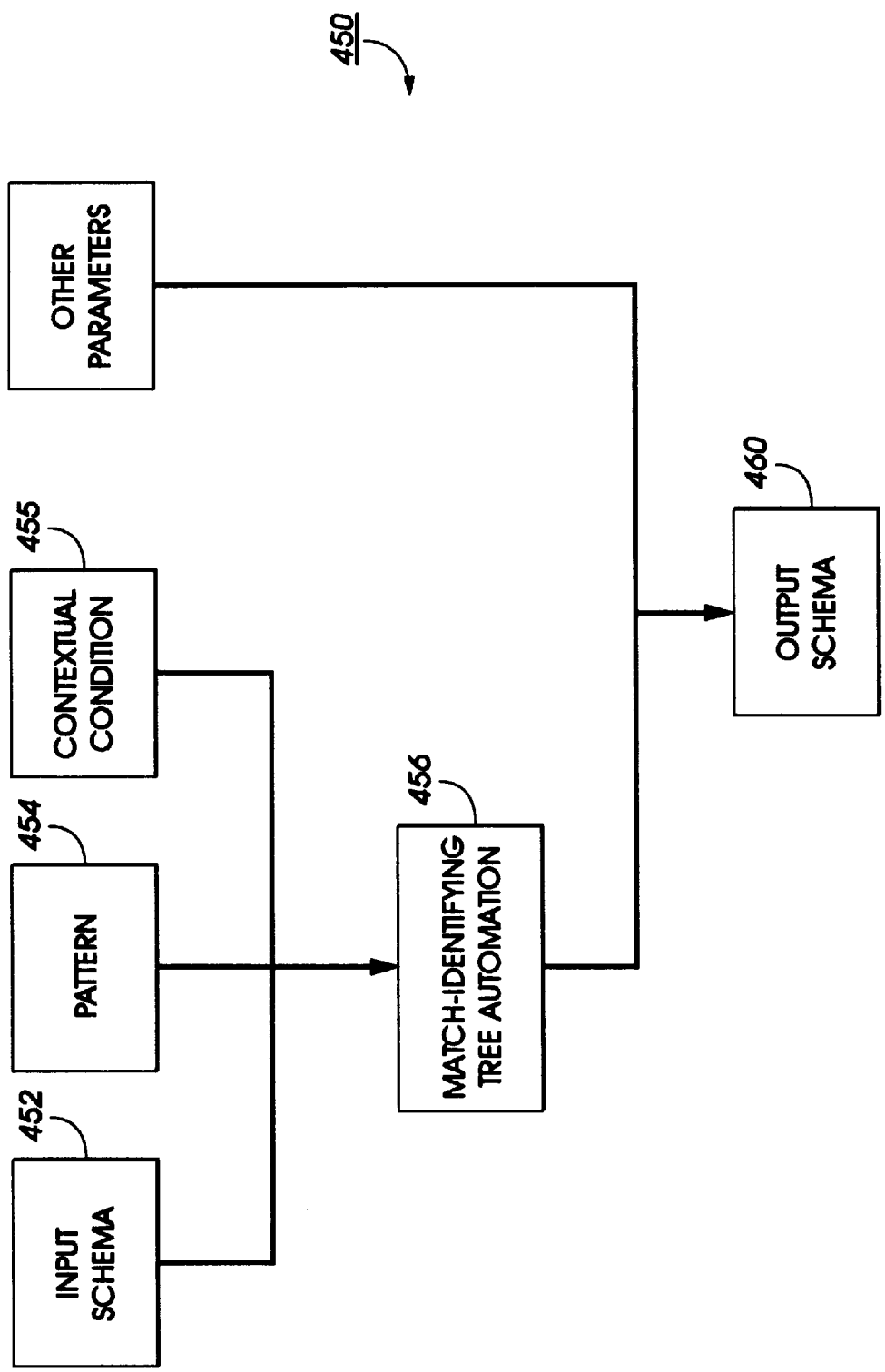
FIG. 8 shows the principle of the present invention, of the construction of a match identifying tree automaton, from an input schema, a pattern, and a contextual condition.

A system for data format modification and translator construction is disclosed. In the following description, numerous specific details are set forth, such as the composition of a Data Type Definition (DTD) in the Standard Generalized Markup Language (SGML), in order to provide a thorough understanding of the present invention. It would be apparent, however, to one skilled in the art to practice the invention without such specific details. In other instances, specific implementation details, such as the creation of an original DTD, have not been shown in detail in order not to unnecessarily obscure the present invention.

The currently preferred embodiment of the present invention is implemented on a computer based system and is used for the construction of translators for SGML DTDs. However, the concepts could also be used to build translators for other document formats (e.g., for documents in a format for a first word processor to the format for a second word processor). Moreover, the basic concepts of the present invention could be used for other applications such as the modification of database schema and the translation of database instances or for computer language translation in the translation of grammars.

The currently preferred embodiment of the present invention is implemented as a program written in the C++ programming language for use on a Unix (TM) based Computer System (Unix is a trademark of American Telephone & Telegraph). However, it would be apparent to have used alternative programming languages for use on other computer based systems.

It is not unusual that a data format, e.g., a database schema or document format, will become obsolete or in need of change in order to accommodate some new desired function. This is a common occurrence for documents defined in the Standard Generalized Markup Language (SGML) format. SGML is an International Standards Organization standard (ISO 8879) that specifies a representation language for document types and document instances. One important feature of SGML is that users can define Document Type Definitions (DTDs) enabling information within SGML documents to be retrieved and reused in the future. Each DTD defines a set of generic identifiers (GI's). For each GI, its potential set of components is specified by a regular expression (called content model) and optionally some included or excluded GI's. Also, a set of attributes can be associated with each GI. In SGML, a document instance is expressed as a sequence of character strings and markups, which indicate the structure of the document. A concise description of SGML can be found in the publication entitled "The SGML Handbook", Charles F. Goldfarb, 1990 available from Oxford University Press.

FIGS. 1 and 2 illustrate a DTD D0 and its document instance d0. Referring to FIG. 1, the DTD D0 declares five GI's: doc 101, fn 102, sec 103, title 104, and para 105. The content model for GI doc 101 is (sec) 106, implying that each doc element contains exactly one sec element. For GI sec 103, its content model (title, para*, sec*) 107 indicates that each sec element consists of a title and optionally several paragraphs and subsections. As indicated by content model (#PCDATA) 108, each title, para, and fn is a sequence of character data. Note that #PCDATA is a reserved SGML keyword indicating parsed character data that is checked by the SGML parser for any embedded tag or entity references. D0 also declares fn to be an included GI for doc through +(fn) 109, and an excluded GI for title through –(fn) 110. Such a declaration enables fn-elements to appear at any place in a D0 document instance provided that each fn-element is not a component of some title-element.

In the instance d0 of FIG. 2, the markups <X> and </X> indicate the start and end of an element X, respectively. Although not required by SGML the hierarchical structure of elements is shown for clarity through space indentions. FIG. 3 illustrates how the instance d0 would appear when formatted and printed.

For various reasons, SGML DTDs evolve (such as, adding new GI's or arranging GI's in a different order) or otherwise need to be changed (to permit exchange of SGML document information). To keep document instances consistent with their DTDs, translators to translate instances of an old DTD into instances of the new DTD are constructed. Thus, there are two tasks: DTD evolution (editing) and document instance translator construction.

Typically, the DTD editing and document instance translator construction are treated as separate tasks. First, a user modifies the existing DTD D to a new DTD D'. Usually, it is carried out by using a DTD editor (e.g., Near&Far available from MicroStar Software DTD of Canada) or a general textual editor (e.g., GNU-Emacs). Then, the user creates a translator for translating DTD D document instances to DTD D' document instances. Various tools are commercially available for translator construction (e.g., Omnimark (TM) available from Exoterica Corporation of Canada).

There are two major drawbacks to such an approach. First, it is very time consuming. Typically, an engineer spends several weeks or months for DTD evolution and translator construction. Second, it is very difficult to guarantee that the document instance translator always produces correct instances of the target DTD.

The computer based system on which the currently preferred embodiment of the present invention may be implemented is described with reference to FIG. 4. Referring to FIG. 4, the computer based system is comprised of a plurality of components coupled via a bus 401. The bus 401 may consist of a plurality of parallel buses (e.g. address, data and status buses) as well as a hierarchy of buses (e.g. a processor bus, a local bus and an I/O bus). In any event, the computer system is further comprised of a processor 402 for executing instructions provided via bus 401 from Internal memory 403 (note that the Internal memory 403 is typically a combination of Random Access and Read Only Memories). The processor 402 will be used to perform the various primitive operations for DTD evolution and translator construction as described below. Instructions for performing such operations are retrieved from Internal memory 403. The processor 402 and Internal memory 403 may be discrete components or a single integrated device such as an Application Specification Integrated Circuit (ASIC) chip.

Also coupled to the bus 401 are a keyboard 404 for entering alphanumeric input, external storage 405 for storing data and instance translators, a cursor control device 406 for manipulating a cursor, and a display 407 for displaying visual output. The keyboard 404 would typically be a standard QWERTY keyboard but may also be a telephone like keypad. The external storage 405 may be fixed or removable magnetic or optical disk drive. The cursor control device 406, e.g. a mouse or trackball, will typically have a button or switch associated with it to which the performance of certain functions can be programmed.

An important attribute of the present invention is that it enables users to focus their efforts on DTD evolution. In the present invention a user defines a sequence of DTD operators to modify DTDs in an incremental manner. Invisible to users, the system automatically generates an instance translator from this sequence of operators.

In this embodiment, we only consider binary trees over a finite alphabet. In other words, we allow a node to have at most two direct subordinates, and we do not allow nodes to have attributes or contents. To allow more than two subordinates, we only have to use the tree automaton proposed by Thatcher (Thatcher, "Characterizing derivation trees of context-free grammars through a generation of finite automata theory", Journal of Computer and System Sciences, 1: 317–322, 1967) as a basis. To allow nodes to have attributes and contents, we only have to introduce a symbol for each combination of a node type, attribute values, and a content.

The present invention is based on the theory of string regular languages, as in Hopcroft et al, "Introduction to Automata Theory, Languages and Computation", Addison Wesley, Reading Mass., 1979, and that of tree regular languages Gecseg et al. Tree Automatia, Akademiai Kiadda, Budapest, Hungary, 1984. Furthermore, Nivat and Podelski's work on pointed trees is used as a basis (Nivat et al, "Another variation on the common subexpression problems," Theoretical Computer Science, 114, 1993, Podelski , "A monoid approach to tree automata, in Nivat and Podelski, Tree Automata, and Languages, Studies on computer Science and Artificial Intelligence 10", North Holland, 1992). Here we give definitions:

A string over a finite alphabet $\Sigma$ is an element of the free monoid $\Sigma^*$. The addresses of a string s are given as $1, 2, \ldots, n$, where n is the length of s. The i-th symbol of a string s is denoted by $s_i$.

A deterministic string-automata (DSA) is a 5-tuple $<Q, \Sigma, \delta, q_0, Q_{71}>$, where Q is a finite set of states, $\Sigma$ is a finite alphabet, $\delta$ is a function from $Q \times \Sigma$ to Q, $q_0$ (initial state) is an element of Q, and $Q_{71}$ (final states) is a subset of Q.

For a string s of length n and a DSA $M=<Q,\Sigma,\delta,q_0,Q_{71}>$, the computation of s by M, denoted M[s], is a string over Q such that the length of M[s] is n+1, (M[s])i=$q_0$, and (M[s])i+1=$\delta$((M[s])i,si) ($1 \leq i \leq n$). If (M[s])n+1$\in Q_{71}$, this computation is successful and s is accepted by M. The set of strings accepted by M is denoted by L(M). If a language L(a set of strings) is accepted by some DSA M, L is string-regular.

A non-deterministic string-automata (NSA) is a 5-tuple <Q, $\Sigma$, $\delta$, $q_0$,$Q_f$>,where Q, $\Sigma$ and $Q_f$ are as above, $\delta$ is a relation from Q×$\Sigma$ to Q, and $Q_0$ (initial states) is a subset of Q.

For a string s of length n and a NSA M=<Q, $\Sigma$, $\delta$,$q_0$,$Q_f$>, a computation of s by M is a string t over Q such that the length of t is n, $t_1 \in Q_0$, and $\delta$(ti, si ti+1) ($1 \leq i \leq n$). If $t_n$+1 $\in Q_f$, this computation is successful. If there is at least one successful computation, s is accepted by M It is well known that a language is string-regular if and only if it is accepted by some NSA. If there is at most one successful computation for every string, M is unambiguous. Furthermore, if an unambiguous NSA M accepts s, we denote the successful computation of s by M[s].

A tree over a finite alphabet $\Sigma$ is $\epsilon$ (the null tree) or a(u, v) where a is a symbol in $\Sigma$, and u and v are trees. We assume that a($\in \Sigma$) and a($\epsilon\epsilon$) are identical. The set of trees is denoted by $\Sigma$#. We assign to each t($\in \Sigma$#) a set of addresses D(t) ($\subset \{1,2\}$*) such that:

If t is $\epsilon$, then D(t)=$\emptyset$.v

If t=a(u,v), then D(t)=$\{\epsilon\}\cup\{1d|d \in D(u)\}\cup\{2d|d\in D(v)\}$. The symbol at an address d$\in$D(t) is denoted by $t_d$. That is, if t=a(u,v), then $t_1$=a, $t_{1d}$=$u_d$ (d $\in$D(v)), and $t_{2d}$=$v_d$ (d $\in$D(v)). An address d in D(t) is a leaf address if $d_1$ $\notin$D(t). A subtree of t at an address d, denoted t↓d, is $t_d(t_{d1}(t_{d11}( \ldots )t_{d12}( \ldots ))t_{d2}(t_{d21}( \ldots )t_{d22}( \ldots )))$.

A deterministic tree-automaton (DTA) is a 5-tuple <Q, $\Sigma$, $\delta$, $q_0$, $Q_f$>, where Q is a finite set of states, $\Sigma$ is a finite alphabet, $\delta$ is a function from Q×Q×$\Sigma$ to Q, $q_0$. (initial state) is an element of Q, and $Q_f$(final state set) is a subset of Q.

For a tree t and a DTA M=<Q, $\Sigma$, $\delta$, $q_0$, $Q_f$>, the computation of t by M, denoted M[t], is a tree over Q inductively defined as below:

If t=$\epsilon$, then M[t]=$q_0$.

If t=a(u, v), then M[t]=$\delta$((M[u])$_\epsilon$, (M[v])$_\epsilon$, a) (M[u]M[v]). If (M[t])$_\epsilon \in Q_f$, this computation is successful and t is accepted by M. The set of trees accepted by M is denoted by £(M). If a language £ (a set of trees) is accepted by some DSA M, £ is tree-regular.

A non-deterministic tree-automaton (NTA) is a 5-tuple <Q, $\Sigma$, $\delta$, $q_0$, $Q_f$>, where Q, $\Sigma$, and $Q_f$ are as above, $\delta$ is a relation from Q×Q×$\Sigma$ to Q, and $Q_0$ (initial state set) is a subset of Q.

For a tree t and an NTA M=<Q, $\Sigma$, $\delta$, $q_0$, $Q_f$>, a computation of t by M is a tree t̄ over Q such that:

If t=$\epsilon$ then t̄ $\in Q_0$

If t=a(u v), then t̄=$\delta$($\bar{u}_\epsilon \bar{v}_\epsilon$, a)($\overline{uv}$),where $\bar{u}_r$ and $\bar{v}$ are computations of u and v, respectively. If $\bar{t}_\epsilon \in Q_f$, this computation is successful. If there is at least one successful computation, t is accepted by M. It is well known that a language is tree-regular if and only if it is accepted by some NTA. If there is at most one successful computation for every tree, M is unambiguous. Furthermore, if an unambiguous NTA M accepts tree t, we denote the successful computation of t by M[t].

A pseudo-DTA is a 4-tuple <S, $\Sigma$, $\lambda$, 50>, where S is a finite set of states, $\Sigma$ is a finite alphabet, $\lambda$ is a function from S×S×$\Sigma$ to S, and $s_0$ (initial state) is an element of S. The only difference from DTA's is that a pseudo-DTA does not have a final set state. The computation of a pseudo-DTA is defined similarly to that of a DTA.

A pointed tree over a finite alphabet $\Sigma$ is a tree t over $\Sigma \cup \{\zeta\}$ ($\zeta \notin \Sigma$') such that $\zeta$ occurs in t only as a leaf, and $\zeta$ occurs once and only once. The set of pointed trees over $\Sigma$~ is denoted by $\Sigma^{(\#)}$ An envelope of a tree t at an address d, denoted t↑d, is a pointed tree obtained from t by replacing the subtree t↓d with $\zeta$. For example, a(b(c)d)↑1=a($\zeta$d).

The result of replacing $\zeta$ with another tree or pointed tree t' is denoted by t'o t. For example, b($\zeta\epsilon$) o a($\zeta\epsilon$)=a(b($\zeta\epsilon$)$\epsilon$). Obviously, ($\Sigma^{(\#)}$;o, $\zeta$) is a monoid. For convenience, we define t'o t as t when t is not a pointed tree but a tree.

A pointed-base tree is a pointed tree of the form a($\zeta$t) or a(t$\zeta$). Any pointed tree t is uniquely decomposed into a sequence of pointed-base trees $t_1,t_2, \ldots, t_k$ such that $t_1$ o $t_2$ o $\ldots$ o $t_k$=t (k$\geq$0). For example, a(b($\zeta\epsilon$)$\epsilon$) is uniquely decomposed into b($\zeta\epsilon$), a($\zeta\epsilon$).

A pointed-base tree representation is either a triplet <a, $\zeta$, S> or a triplet <a, S, $\zeta$>, where a $\in \Sigma$, and S is a tree-regular language over $\Sigma$. We assume that S is represented by a DTA that accepts S. The language represented by <a, $\zeta$, S >denoted £(<a,$\zeta$,S>), is $\{a(\zeta t) | t \in S\}$; likewise, £(<a,S,$\zeta$>) is $\{a(t\zeta|t\in S\}$).

A pointed tree representation is a pair <$\psi$, E>, where $\psi$ is a bijection from a finite alphabet to a finite set of pointed-base tree representations, and E is a string-regular language over the domain of $\psi$. Again, we assume that E is represented by a DSA that accepts E. The language represented by <$\psi$,E~>,denoted £(<$\psi$,E>), is $\{t_1$ o $t_2$ o $\ldots$ o $t_k|t_i \in$£($\psi(e_i)$) for some $e_1 e_2 \ldots e_k \in E, 1 \leq i \leq k\}$. Such a language is called pointed tree language.

Figure 9:
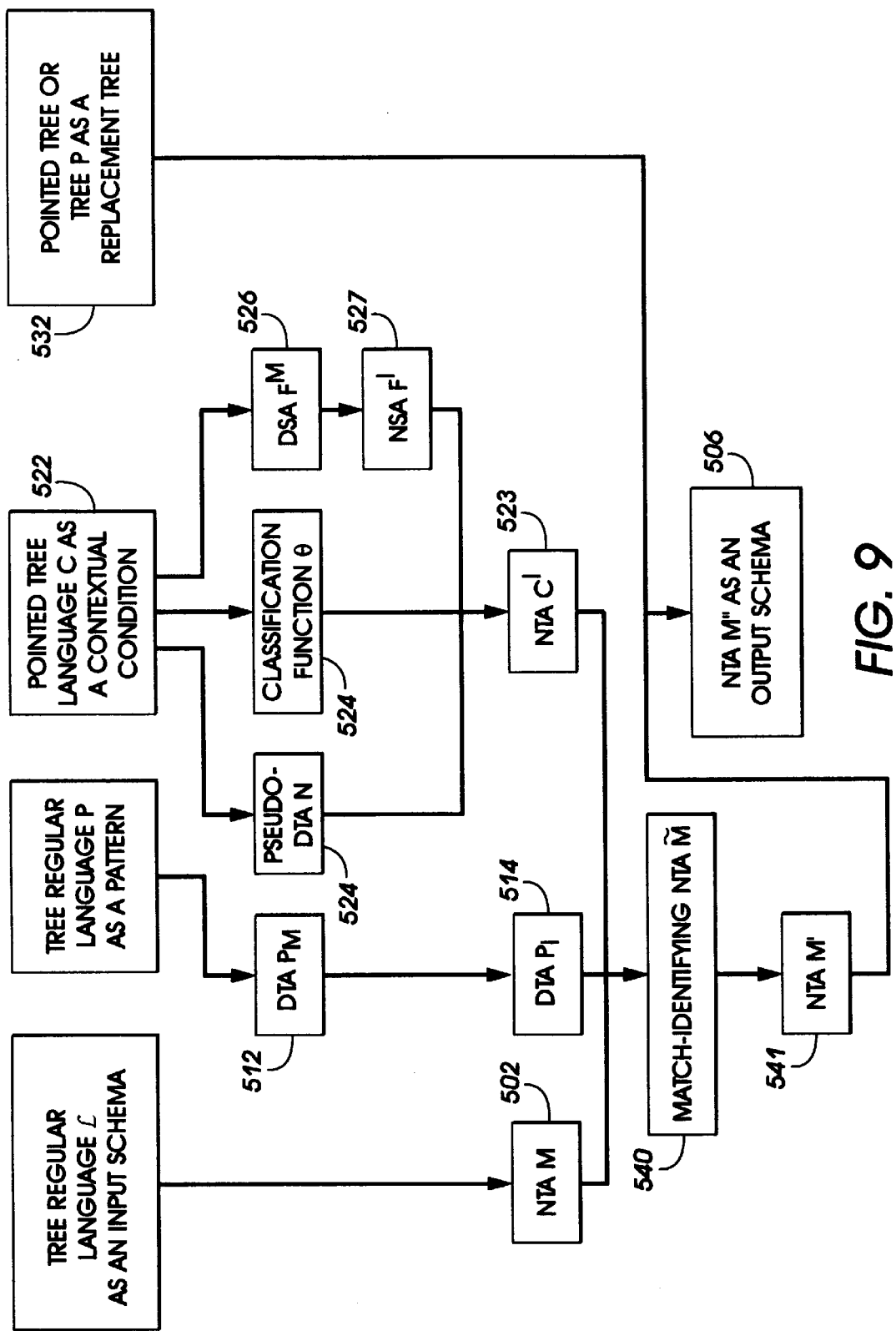
FIG. 9 illustrates a possible embodiment of the invention.

Now we describe the structure of this embodiment, with reference to FIG. 9.

Input Schema

An input schema 502 is an NTA M=<Q, $\Sigma$, $\delta$, $q_0$, $Q_f$>. However, we can use any representation (e.g., tree regular expression) of a tree regular language as long as we can construct M from that representation.

Output Schema

The output schema 506 to be constructed is an NTA M". (However, we can convert M" into some other representation). This NTA accepts a tree t if and only if t is the result of applying the transformation rule to some tree that is an instance of the input schema.

Pattern

A pattern P is a tree regular language 512 represented by a DTA $P_M$=<P, $\Sigma$, $\alpha$, $p_0$, $P_f$>that accepts P. (However, we can use any representation as long as we can construct $P_M$ from that representation.) Given a tree t, the subtree of t at an address d matches P if t↓i $\in$P.

Contextual Condition

A contextual condition C is a pointed tree language represented by a pointed tree representation <$C_\psi$, $C_\epsilon$> or 522. (However, we can use any representation as long as it represents a set of pointed trees and a pointed tree representation can be constructed from that representation.) Given a tree t, the envelope of t at i satisfies C if t↑i $\in$C.

Replacement Tree

A replacement tree $\rho$ is a pointed tree 532 or a tree over $\Sigma$. To delete nodes located by the pattern P and contextual condition C and insert a tree instead, we choose that tree as $\rho$. To insert nodes or trees while keeping those nodes, we use a pointed tree as $\rho$.

Transformation Rule

A transformation rule is a triplet <P, C, ρ>, where P is a pattern, C is a contextual condition, and ρ is a replacement tree.

To define the semantics of a transformation rule, we need two auxiliary functions. A marking function $m_c^P$ from $\Sigma\#$ to $(\Sigma \cup \{w\})\#$ (we shall assume $w \notin \Sigma$) inserts w, for every address d such that $t{\downarrow}d \in P$ and $t{\uparrow}d \in C$, between d and its direct superior; the first and second subordinates of the inserted node are $\epsilon$ and $t{\downarrow}d$, respectively. Formally, $m_c^P(t) = \text{subst}(t,\epsilon)$, where subst is inductively defined as below:

$$\text{subst}(\epsilon, d) = \epsilon$$

$$\text{subst}(a\langle u\, v\rangle, d) =$$

$$\begin{cases} w\langle \epsilon a \langle \text{subst}(u, d1)\, \text{subst}(v, d2)\rangle\rangle & (t{\downarrow}d \in \mathcal{P}, t{\uparrow}d \in C) \\ a\langle \text{subst}(u, d1)\, \text{subst}(v, d2)\rangle & (\text{otherwise}) \end{cases}$$

A replacing function $h_\rho$ from $(\sum \cup \{w\})^\#$ to $\sum^\#$ is defined as below:

$$h_\rho(t) = \begin{cases} \epsilon & (t = \epsilon) \\ h_\rho(v) \circ \rho & (t = w\langle u\, v\rangle) \\ a\langle h_\rho(u)\, h_\rho(v)\rangle & (t = a\langle u\, v\rangle, a \in \Sigma) \end{cases}$$

The result of applying transformation rule <P, C, ρ> to a string s is defined as $h\rho(m_c^P(s))$.

Procedure

An outline of the output schema 506 construction is as follows. We first create a DTA $P_I$ 514 from the pattern $P_M$ 512. After constructing an unambiguous NTA $C^I$ 523, we create a match-identifying NTA $\tilde{M}$ 540 by creating the intersection automaton of M, $P_I$, and $C^I$.

The construction of $C^I$ 523 is done by first constructing a pseudo DTA N 524, a classification function θ 525, and a DSA $F^M$ 526, then constructing an unambiguous NSA $F^I$ 527 from $F^M$, and finally by combining N, Θ, and $F^I$ Having constructed $\tilde{M}$, we create an NTA M' 541 by modifying it and then create NTA M'' 506 by further modifying M' with respect to ρ.

$P_I$

We already have a DTA $P_M = <P, \Sigma, \alpha, p_0, P_f>$ that accepts P. From $P_M$, by allowing any state as a final state, we construct a DTA $P_I = <P, \Sigma, \alpha, p_0, P>$. $P_I$ accepts any tree. Furthermore, $P_I$ identifies matches: for any tree t, $(P_I[t])_d \in Q_f$ if and only if $s{\downarrow}d \in P$.

N

Consider a set $\{S \mid <a,\zeta,S> \in \text{range}(C\psi)$ or $<a, \zeta S>$ range $(C\psi)\}$. By enumerating its elements, we obtain a sequence $S_1, S_2, \ldots S_m$. Let $M_i$ be a DTA $<S_i, \Sigma\lambda_i\, s_i^0\, S_i^f>$ that accepts $S_i$ ($1 < i < m$). For a vector $\vec{x} = <x_1, x_2, \ldots, x_m>$ in $\{-1, 1\}^m$, we define $B(\vec{x})$ and $S(\vec{x})$ as below:

$$B(\vec{x}) = X_1 \cap X_2 \cap \cdots \cap X_m,$$

where $X_i = \begin{cases} S_i & (x_i = 1) \\ \Sigma^\# - S_i & (x_i = -1) \end{cases}$ $$S(\vec{x}) = Y_1 \cap Y_2 \cap \cdots \cap Y_m,$$

where $Y_i = \begin{cases} S_1 \times \cdots \times S_{i-1} \times S_i^f \times S_{i+1} \times \cdots \times S_m & (x_i = 1) \\ S_1 \times \cdots \times S_{i-1} \times (S_i - S_i^f) \times S_{i+1} \times \cdots \times S_m & (x_i = -1) \end{cases}$ Obviously, when $\vec{x} \neq \vec{y}$, $B(\vec{x})$ and $B(\vec{y})$ are disjoint, $S(\vec{x})$ and $S(\vec{y})$ are disjoint.

A pseudo-DTA N is defined as $<S, \Sigma, \lambda, s_0>$, where $$S = S_1 \times S_2 \times \cdots \times S_m,$$

$s_0 = <s_1^0, s_2^0, \ldots s_m^0>$, and $\lambda(<s_1,s_2,\ldots,s_m>,<s'_1,s'_2,\ldots,s'_m>,x) = <\lambda_1(s_1,s'_1,x), \lambda_2(s_2,s'_2,x), \ldots \lambda_m(s_m,s'_m,x)>$.

The DTA created by adding $S(\vec{x})$ as a final state set, namely $<S, \Sigma, \lambda, s^0, S(\vec{x})><$, accepts $B(\vec{x})$.

θ

We construct a function θ from $\Sigma \times S \times \{1, 2\}$ to Δ, where Δ is a finite set as below:

$\Delta = \{[a, \zeta, B(\vec{X})] \mid x_i = 1, <a, \zeta, S_i> \in \text{range}(P_f)\}$ $\cup \{[a, B(\vec{X}), \zeta] \mid x_i = 1, <a, S_i, \zeta> \in \text{range}(P_f)\}$ Observe that for any $s \in S$, there exists one, and one, $\vec{X}$ such that $s \in S(\vec{X})$. So the following is a sound definition:

$\theta(a,s,1) = [a, \zeta, B(\vec{X})]$ where $\vec{X} \in \{-1, 1\}^m$ such that $s \in S(\vec{X})$ $\theta(a,s,2) = [a, B(\vec{X}), \zeta]$ where $\vec{X} \in \{-1, 1\}^m$ such that $s \in S(\vec{X})$

$F^M$

We construct a DSA $F^M = <F, \Delta, \mu, f_0, F_f>$. First, we define a string regular language F over Δ as the image of Cυ by x where s is a substitution function from (PT) to the power set of D as below:

$\xi(P_\psi^{-1}(<a, \zeta, S_i>)) = \{[a, \zeta, B(\vec{X})] \mid x_i = 1\}$ $\xi(P_\psi^{-1}(<a, S_i, \zeta>)) = \{[a, \zeta, B(\vec{X})] \mid x_i = 1\}$ Now, we construct as a DSA that accepts the mirror image of F. This is done by constructing a NSA that accepts F, then swapping the direction of transition arrows, and finally applying the well-known subset-construction algorithm.

$F^I$

We construct an unambiguous NSA $f^I <F, \Delta, \mu', F, \{f_0\}>$ from $F^M = <F, \Delta, \mu, f_0, F_f>$ by first allowing any state as a final state and then reversing the direction of transition arrows. Formally, $\mu'$ is defined as $\mu'(f_1, x, f_2) \Leftrightarrow \mu(f_2, x) = f_1$.

$C^J$

We construct an NTA $C=<C, \Sigma, \beta, C_0, C_f>$ from $N=<S, \Sigma, \lambda, s_0>$, $\theta$. and F. The idea is to simulate the execution of N and also to simulate F from every leaf d to the root. A state is a pair of $s \in S$ and $f \in F$; in other words, $C=S\times F$. The first constituent s simulates N. The second constituent $f$ simulates $F^J$ for every path. Notice that we do not need more than one state of $F^J$ as every path should merges. If not, we make this NTA fail.

An initial state is a pair of $S_0$ and $f$ ($\in F$); that is, $C_0=\{s_0\}\times F$. The first constituent $s_0$ is the initial state of N. The second constituent $f(\in F)$ is an initial state of $F^J$. A final state is a pair of any state of N and the final state of $F^J$; that is $C_f=S\times\{f_0\}$). A marked state is a pair of any state of N and a state $f(\in F_f)$; that is , $C_m=S\times F_f$

The Match-identifying NTA

By augmenting the input schema M with $P_J$ and $C^J$, we define a match-identifying NTA $\tilde{M}=<\tilde{Q}, \Sigma,\delta,\tilde{Q}_0,\tilde{Q}_f>$. Here the state set $\tilde{Q}$ is $Q\times P\times C$, the initial state set $\tilde{Q}_0$ is $Q_0\times P_0\times C_0$, the final state set $\tilde{Q}_f$ is $Q_f\times P\times C_f$, and the transition relation $\eta$ is defined as $$\delta(<q_1, p_1, c_1>, <q_2, p_2, c_2>, x, <q_3, p_3, c_3>) \Leftrightarrow \delta(q_1, q_2, x, q_3),$$

$$\alpha(p_1, p_2, x) = p_3, \text{ and } \beta(c_1, c_2, x, c_3).$$

Obviously, $\tilde{M}$ is unambiguous and accepts . Given a tree $t \in L$, we denote its successfuil computation by $\tilde{M}[t]$. Let $\tilde{Q}_p^c$ be $Q\times P_f\times C_m$. Then, $\tilde{M}$ and $\tilde{Q}_p^c$ identify matches: for any tree t, $(\tilde{M}[t])_d \in \tilde{Q}_p^c$ if and only if $t\downarrow d \in P$ and $t\uparrow d \in C$.

M'

We construct an NTA M', by modiiying $\tilde{M}$, that accepts $\{m_p^c(t) | t \in L\}$.

We first introduce an intermediate state $[\tilde{q}]$ for each $\tilde{q} \in \tilde{Q}_p^c$. If $\tilde{q}$ is a final state of $\tilde{M}$, then $[\tilde{q}]$ becomes a final state of M' and $\tilde{q}$ becomes a non-final state. Thus, the state set Q' and the final state set $Q'_f$ of M' is as follows:

$$Q' = \tilde{Q} \cup \{[\tilde{q}] | \tilde{q} \in \tilde{Q}_P^C\}$$

$$Q'_f = (\tilde{Q}_f - \tilde{Q}_P^C) \cup \{[\tilde{q}] | \tilde{Q} \in \tilde{Q}_P^C \cap \tilde{Q}_f\}$$

We then define a relation $\delta'$ from $Q'\times Q'\times(\Sigma\cup\{w\})$ to Q'. Intuitively speaking, we introduce an arrow labeled w from $\tilde{q}_1 \in \tilde{Q}_0$ and $\tilde{q}_2 \in \tilde{Q}_p^c$ to $[\tilde{q}_2]$; we replace an arrow labeled x from $\tilde{q}_1 \in \tilde{Q}$ and $\tilde{q}_2 \in \tilde{Q}_p^c$ to $\tilde{q}_3 \in \tilde{Q}$ by an arrow labeled x from $\tilde{q}_1$ and $[\tilde{q}_2]$ to $\tilde{q}_3$; and we replace an arrow labeled x from $\tilde{q}_1 \in \tilde{Q}_p^c$ and $\tilde{q}_2 \in \tilde{Q}$ to $\tilde{q}_3 \in \tilde{Q}$ by an arrow labeled x from $[\tilde{q}_1]$ and $\tilde{q}_2$ to $\tilde{q}_3$. A formal definition is shown below:

$$\delta' = (\tilde{\delta} - \tilde{Q}_P^C \times \tilde{Q} \times \Sigma \times \tilde{Q} - \tilde{Q}\times \tilde{Q}_P^C \times \Sigma \times \tilde{Q}) \cup$$

$$\{<\tilde{q}_1, \tilde{q}_2, w, [\tilde{q}_2]> | \tilde{q}_1 \in \tilde{Q}_0, \tilde{q}_2 \in \tilde{Q}_P^C\} \cup$$

$$\{<\tilde{q}_1, [\tilde{q}_2], x, \tilde{q}_3> | \tilde{\eta}(\tilde{q}_1, \tilde{q}_2, x, \tilde{q}_3), \tilde{q}_1 \in \tilde{Q}, \tilde{q}_2 \in \tilde{Q}_P^C, \tilde{q}_3 \in \tilde{Q}\} \cup$$

$$\{<[\tilde{q}_1], \tilde{q}_2, x, \tilde{q}_3> | \tilde{\eta}(\tilde{q}_1, \tilde{q}_2, x, \tilde{q}_3), \tilde{q}_1 \in \tilde{Q}_P^C, \tilde{q}_2 \in \tilde{Q}, \tilde{q}_3 \in \tilde{Q}\}$$

M"

Finally, from M' and p, we construct an NTA M" that accepts $\{h_p(m_p^c(t)) | t \in L\}$.

A formal construction can be noted in the Gecseg reference.

The disclosed method may be readily implemented in software using object oriented software development environments that provide portable source code that can be used on a variety of computer or workstation hardware platforms. Alternatively, the disclosed data or structured document processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The document processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

What is claimed is:

1. A computer-based method for transforming document schema, comprising:
   providing (a) an input schema to which an input document is conformable (b) a tree transformation rule defined by at least a pattern, and (c) a contextual condition;
   using a processor to construct a match-identifying tree automaton from said at least one pattern, said contextual condition, and said input schema;
   modifying said match-identifying tree automaton to create an output schema; and
   storing the output schema in a memory for use in conforming an output document.

2. The computer based method of claim 1, wherein said providing step includes providing a deterministic tree automaton as a pattern.

3. The computer based method of claim 1, wherein said providing step includes providing a pointed tree language represented by a pointed tree representation as a contextual condition.

4. The computer based method of claim 1, wherein said providing step includes providing a non-deterministic or deterministic tree automaton as an input schema.

5. The computer based method of claim 1, wherein said using step includes creating a match-identifying tree automaton through a deterministic tree automaton by allowing any state as a final state.

6. The computer based method of claim 1, wherein said using step includes creating an unambiguous non-deterministic tree automaton by constructing a pseudo deterministic tree automaton, a classification function, and a deterministic string automaton from said tree automaton.

7. The computer based method of claim 6, further comprising constructing an unambiguous non-deterministic string automaton from said deterministic string automaton by first allowing any state as a final state and then reversing transition direction.

8. The computer based method of claim 7, further comprising constructing an unambiguous non-deterministic tree automaton by combining said pseudo deterministic tree automaton, said classification function, and said unambiguous non-deterministic tree automaton.

9. The computer based method of claim 8, further comprising creating a match-identifying tree automaton by creating an intersection automaton of said pseudo deterministic tree automaton and said unambiguous non-deterministic tree automaton.

10. The computer based method of claim 1, wherein said using step includes constructing a match-identifying tree automaton from an input schema, pattern and contextual condition derived from said input document whereby said match-identifying tree automaton identifies matches at schema levels while accepting trees related to matched schema.

11. The computer based method of claim 1, wherein said modifying step includes modifying said match-identifying tree automaton with operator specified parameters.

12. The computer based method of claim 11, wherein said modifying said match-identifying tree automaton with operator specified parameters includes modifying said match identifying tree automaton according to operator semantics.

* * * * *